United States Patent [19]

Ehrlich

[11] 4,255,937
[45] Mar. 17, 1981

[54] ATMOSPHERIC WATER COLLECTOR

[76] Inventor: Richard Ehrlich, 175 NW. 121 St., North Miami, Fla. 33138

[21] Appl. No.: 962,876

[22] Filed: Nov. 22, 1978

[51] Int. Cl.³ .................... F25D 23/00; F25D 21/14
[52] U.S. Cl. ...................................... 62/264; 62/291
[58] Field of Search .................... 62/1, 185, 291, 124, 62/264

[56] References Cited

U.S. PATENT DOCUMENTS

| 1,931,347 | 10/1933 | Gay | 62/124 |
| 2,409,624 | 10/1946 | Granville | 62/291 X |
| 2,682,758 | 7/1954 | Harris | 62/291 |
| 2,779,173 | 1/1957 | Wurtz | 62/291 |
| 3,035,418 | 5/1962 | Wright | 62/291 X |
| 3,496,731 | 2/1970 | Sholtes | 62/291 X |
| 3,675,442 | 7/1972 | Swanson | 62/291 |

*Primary Examiner*—Lloyd L. King
*Attorney, Agent, or Firm*—Gustave Miller

[57] ABSTRACT

This device is an atmospheric water collector and collects water from the atmosphere by providing a portable cabinet in which the entire apparatus is located, needing only a source of electricity.

A dehumidifier is located in an upper compartment separated by a horizontal partition from a lower compartment. In the upper compartment, two opposite walls are perforated to provide access of new moisture carrying air to circulate about the dehumidifier, and a water discharge spout is also located above the horizontal partition, but is outside the dehumidifier compartment. A water feed conduit from the dehumidifier leads to a water collecting tank in the lower compartment, passing through a water filter on its way. An ultra-violet light bulb sterilizes the water in the tank. A water level control in the collecting tank controls the operation of the dehumidifier. A water pump controlled by a combination water discharge spout and pump switch pumps the water to the spout, up through a check valve and another filter.

A complete electric refrigerator is also included with the cabinet for keeping the water cool and drinkable.

1 Claim, 5 Drawing Figures

ATMOSPHERIC WATER COLLECTOR

BACKGROUND OF THIS INVENTION

Petable drinking water is often very scarce in arid areas, even though electricity may be either easily available, or energy for operating an electric generator may be readily available. In such circumstances, drinking water is very important, and yet often very scarce. This invention provides water under such circumstances, as well as ordinary circumstances.

OBJECTS OF THIS INVENTION

It is an object of this invention to provide a readily portable apparatus for collecting and providing drinking water from the atmosphere wherever there is a source of energy available.

A further object of this invention is to provide an atmospheric water collector which includes a dehumidifier for collecting water from the atmosphere and then sterilizes and filters the collected water and then refrigerates it, to make it potable.

Yet a further object of this invention is to provide an atmospheric water collecting apparatus that is an improvement over all prior art, including U.S. Pat. Nos. 1,931,347; 2,409,624; and 3,675,442.

BRIEF DESCRIPTION OF FIGURES.

With the above and related objects in view, this invention consists in the details of construction and combination of parts, as will be more fully understood from the following description, when read in conjunction with the accompanying drawings, in which.

DETAILED DESCRIPTION OF THE INVENTION

Figure 1:
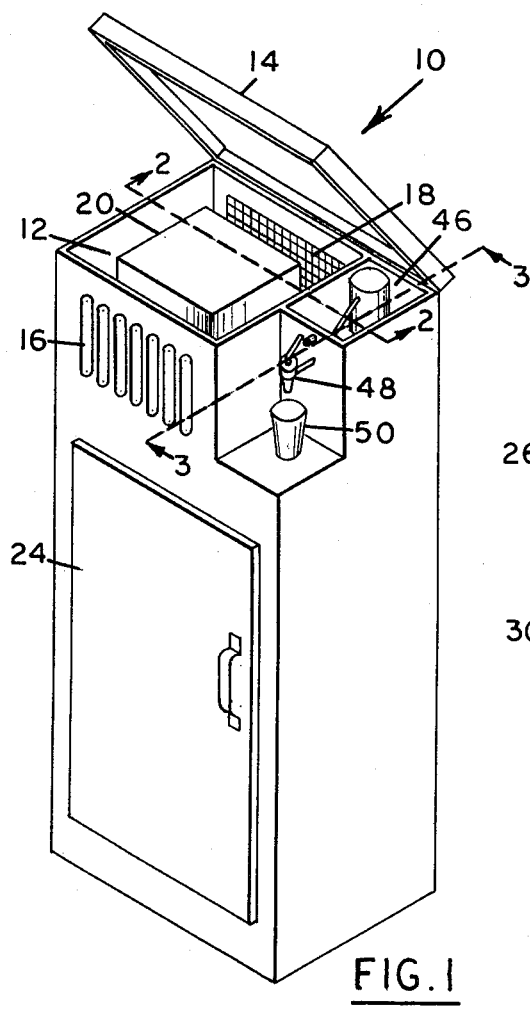
FIG. 1 is a perspective view of the atmospheric water collector of this invention.
Figure 2:
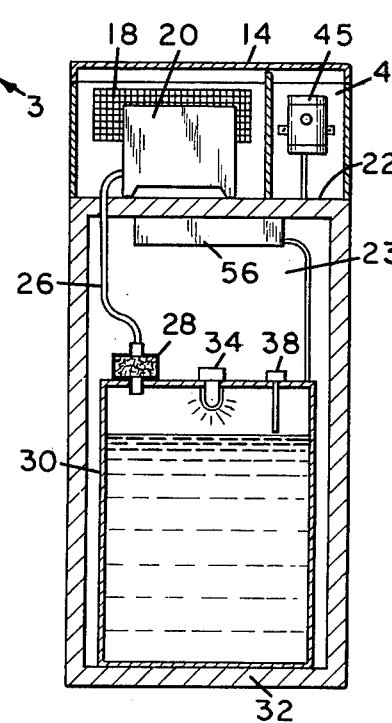
FIG. 2 is a section on line 2—2 of FIG. 1.
Figure 3:
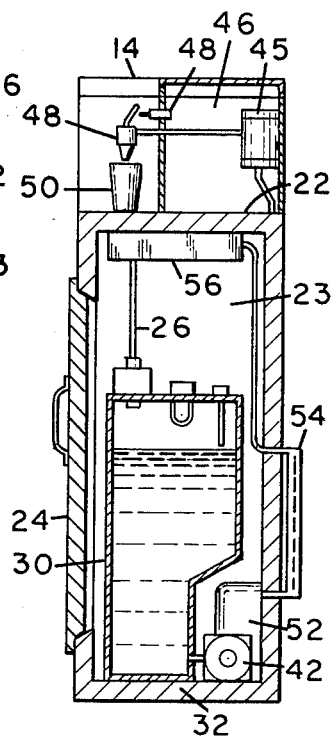
FIG. 3 is a section on line 3—3 of FIG. 1.
Figure 4:
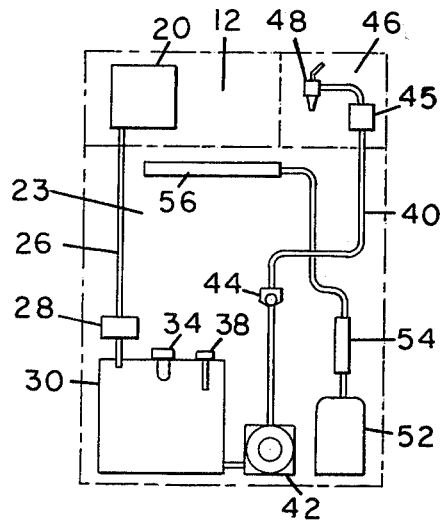
FIG. 4 is a diagrammatic view showing the apparatus parts and their location in the cabinet.

There is shown at 10 the cabinet of this atmospheric water collector in which all the operative parts of this invention are housed for convenience of portability as well as for access for servicing the various parts.

This cabinet 10 includes a top compartment 12 having a top cover 14 hinged thereto, and a perforated front wall 16 and back wall 18 allowing air to readily pass therethrough and circulate about a dehumdifier 20 supported on the horizontal partition 22. Below the partition 22 is provided a lower compartment 23 having a front access door 24.

In view of cover 14 and access door 24, all parts of this apparatus are readily available for service and maintenance whenever needed.

From the bottom of dehumidifier 20 a water feed conduit 25 extends down through a filter 28 and then into a water collecting tank 30 on the bottom floor 32 of the cabinet 10. An ultra-violet light bulb 34 connected in the main line 36 serves to sterilize the water in the tank 30, the filter 28 having served to filter out most dust particles that may have been in the air circulating about the dehumidifier 20.

To secure against overflow of the tank 30, a water level control float 38 is connected in the circuit 39 from main line 36 to dehumidifier 20 to discontinue the dehumidifier operation when the tank 30 is full.

Figure 5:
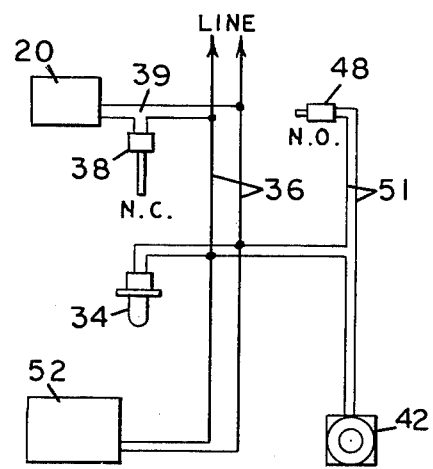
FIG. 5 is a schematic of the elastric set-up.

A water discharge conduit 40 is connected through a pump 42, through a check valve 44 and through another water filter 45 above horizontal partition 22 in an upper back compartment 46 and then outside thereof above partition 22 to a combination water spout valve and pump switch 48, so that activating the spout and switch 48 causes water to flow from the tank 30 through the spout 48 to a water receiver or cup 50 placed on top of the partition 22 below the spout 48. The spout switch 48 connects the pump 42 through circuit 51 to the main line 36 as shown in FIG. 5.

To make the drinking water more palatable, a conventional refrigerating apparatus is also included with the cabinet 10 to cool the compartment 20.

The refrigerator apparatus includes a refrigerator unit 52, condenser 54 and evaporator 56, all located as convenient to cool lower compartment 13 and tank 30 and thus the water therein to a comfortable drinking temperature.

ABSTRACT OF THE DRAWING

In the drawing, like numbers refer to like parts, and for the purposes of explication, marshalled below are the numbers parts of the improved ATMOSPHERIC WATER COLLECTOR of this invention.

10 atmospheric water collector cabinet
12 upper compartment
14 top cover
16 perforated front wall of compartment 12
18 perforated back wall of 12
20 dehumidifier
22 horizontal partition
23 lower compartment
24 access front door
26 water feed conduit from 20 to 30
28 filter in 26
30 water collecting tank
32 bottom floor of 23
34 ultra-violet sterilizing bulb for 30
36 main line
38 water level control float
39 circuit from 36 to 20
40 water discharge conduit, 30 to 48
42 pump
44 check valve in 40
45 filter in 40
46 back compartment
48 combination spout and water pump switch
50 container to receive water from 48
51 circuit from 48 to pump 42
52 refrigerator unit
54 condenser
56 evaporator Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. An atmospheric water collector comprising a cabinet (10), said cabinet having an upper compartment (12) and a separate lower compartment (23), a horizontal partition (22) between said upper and said lower compartments, a dehumidifier (20) located in said upper compartment (23) and a water collecting and storing tank (30) located in said lower compartment (23), a water feed conduit (26) connecting said dehumidifier (20) to said water tank (30), said feed conduit (26) extending through said horizontal partition (22), a filter unit (28) in said feed conduit (26), said water feed conduit (26) conducting its collected water through said filter unit (28), a water discharge conduit (40) connecting said water tank through a water pump (42) and check valve (44) up through said horizontal partition (22) to a combination discharge spout and water pump control switch (48) outside of said upper compartment (12), a water tank water level control (38) in said water tank (30) connected to said dehumidifier (20) to deactivate said dehumidifier when the water level in said water tank is at a predetermined height, and an ultraviolet water sterilizing lamp (34) in said water tank above said predetermined water level height, a filter (45) on said water discharge conduit (40) in a separate compartment (46) above said horizontal partition, said dehumidifier compartment (12) having oppositely located perforated walls (16, 18) permitting air circulation through said upper compartment (12) about said dehumidifier, a refrigerator apparatus including a refrigerator unit (52), a condenser (54) and an evaporator (56), all located to cool said lower compartment (23), said cabinet having a verticle door (24) and door opening providing one verticle wall of said lower compartment (23) and a horizontal cover (41) and horizontal opening at the top of said upper compartment (12), thereby providing ready access to all units of said water collector.

* * * * *